United States Patent [19]
Chrosziel

[11] 3,927,932
[45] Dec. 23, 1975

[54] ZOOM LENS CONTROL DEVICE

[76] Inventor: Alfred S. Chrosziel, Orleanstrasse 5a, 8000 Munich 80, Germany

[22] Filed: Oct. 9, 1974

[21] Appl. No.: 513,402

[52] U.S. Cl. .............................................. 350/187
[51] Int. Cl.² ......................................... G02B 15/14
[58] Field of Search ................................... 350/187

[56] References Cited
UNITED STATES PATENTS

| | | | |
|---|---|---|---|
| 3,404,616 | 10/1968 | Koeber, Jr. ......................... | 350/187 |
| 3,698,253 | 10/1972 | Koeber ................................ | 350/187 X |

FOREIGN PATENTS OR APPLICATIONS

| | | | |
|---|---|---|---|
| 693,706 | 9/1964 | Canada ............................... | 350/187 |

*Primary Examiner*—Paul A. Sacher
*Attorney, Agent, or Firm*—Wolfe, Hubbard, Leydig, Voit & Osann, Ltd.

[57] ABSTRACT

A device for mounting on, or installation in, a zoom lens providing adjustable smooth frictional restriction to rotation of the zoom cylinder in which the friction is between a deformable, low coefficient of friction element and a ring which is threadably adjusted relative to a pressure member bearing on the element. Adjusting the ring relative to the member varies the frictional resistance to movement. The member is floatingly locked to the fixed element of the lens, and a clamping screw is provided to lock the ring and member in adjusted positions.

5 Claims, 1 Drawing Figure

U.S. Patent   Dec. 23, 1975   3,927,932
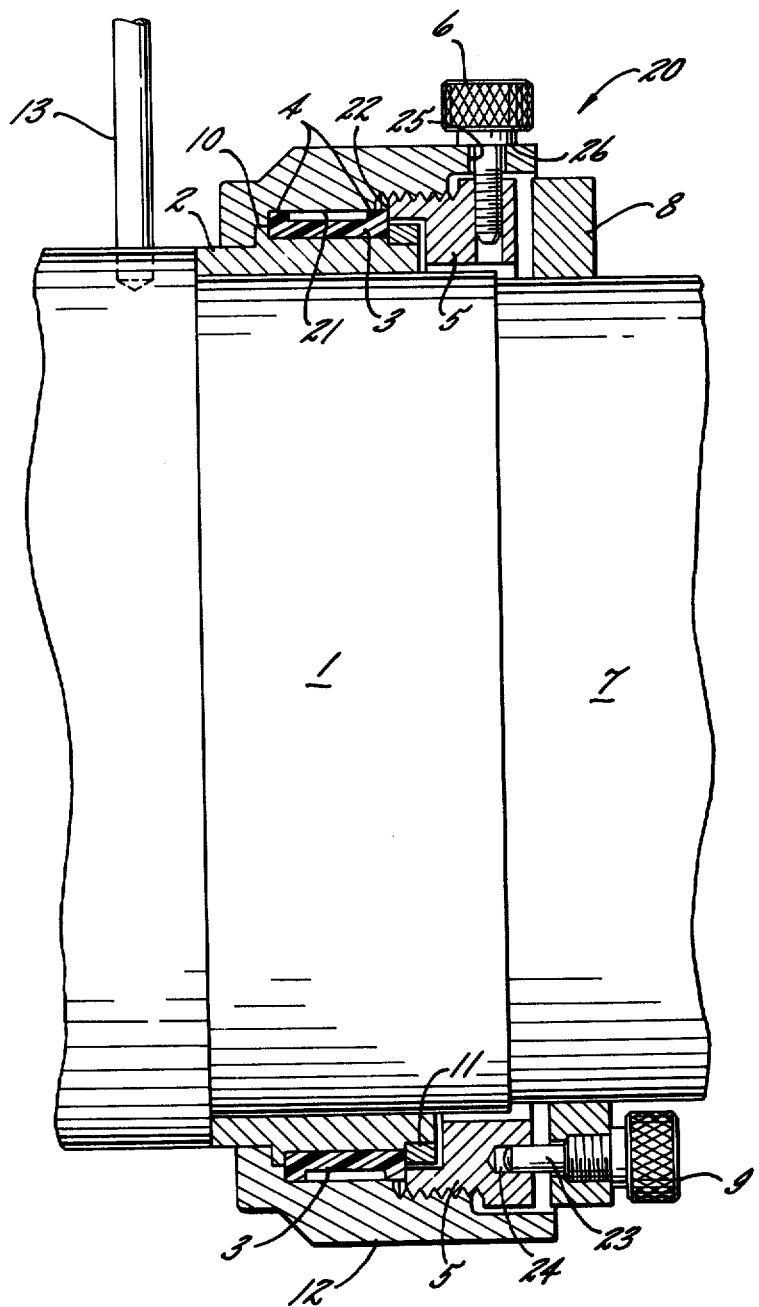

ZOOM LENS CONTROL DEVICE

This invention relates generally to photographic lenses and more particularly concerns a control device for variable focal length, i.e., zoom, lenses.

Lenses for movie and television cameras are normally of the zoom type, often having great ranges in focal length. When such lenses are used with movie or TV cameras, the observer of the resulting images can readily detect jerkiness both in starting and stopping a zooming movement, and in unevenness in the rate at which the focal length of the lens is changed.

Attempts have been made to smooth out the motion of zoom lenses by using inertial drag devices or through electric motor lens drives, but these expedients are physically heavy and bulky, expensive, often unreliable and not always noiseless.

It is the primary aim of the invention to provide a zoom lens control device that permits smooth, jerk-free zooming of a lens that is equivalent in "feel" to the smooth panning and tilting of a "fluid" type of camera panhead.

A further object is to provide a device of the above kind that is adjustable to create a wide range of uniform forces resisting zooming movement so that the lens can be operated from a condition completely free of control to a point where the restraint is such that smooth continuous zooming through a number of minutes can be easily accomplished.

Another object is to provide a device as characterized above that is compact, inexpensive to manufacture, easy to install on or build into a lens, and reliable.

It is also an object to provide a device of the above kind which can be easily adjusted to compensate for the effects of temperature changes, and which avoids the above-mentioned problems with inertial or electric motor lens drives.

Other objects and advantages of the invention will become apparent upon reading the following detailed description and upon reference to the drawing, which is a fragmentary section illustrating a portion of a zoom lens to which the device of the invention is attached.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawing, there is shown a device 20 embodying the invention mounted on a lens comprising a fixed element 7, normally mounted on the camera with which the lens is used, and a zoom cylinder 1. As will be understood by those skilled in this art, relative rotation between the fixed element 7 and the zoom cylinder 1 through some angle of less than 360° changes the effective focal length of the lens, and a lever 13 secured to the cylinder 1 permits the cameraman to make this rotational adjustment of focal length.

In accordance with the invention, the device 20 includes a ring 12 mounted for relative rotation on the zoom cylinder 1 and defining an inner cylindrical surface 21, an annular element 3 of deformable material having a low coefficient of friction fixed to the cylinder 1 and formed with a tongue 4 in engagement with the surface 21, and a pressure member 5, floatingly locked to the fixed element 7, threaded into the ring 12 with a surface 22 bearing against the element 3. In the illustrated construction, the element 3 is fixed to the cylinder 1 through a collar 2, being positioned between a ridge 10 and a snap ring 11, so that the collar 1 can be separated from the lens making the device a lens attachment. The ring 12 rotates on the collar, being positioned by the ridge 10.

The pressure member 5 is locked to the fixed element 7 by several pins 9, only one of which is shown, which are threadably mounted in a ring 8 clamped to the fixed element 7. The pins 9 have portions 23 fitted into holes 24 formed in the element 5 with some looseness both for permitting longitudinal movement of the element 5 relative to the clamping ring 8 as well as to accommodate some eccentricity between the zoom cylinder 1 and the fixed element 7 which often occurs upon relative rotation of such parts. By threadably withdrawing the portions 23 of the pins 9 from the holes 24, the lens can be operated as if the device 20 were not present.

Preferably, the threads joining the ring 12 and the member 5 are quite fine, permitting minute variations in the positioning of the surface 22 against the element 3. In the illustrated construction, the element 3 has a cross sectional U-shape defining two tongues 4 at each edge, and the surface 22 engages the outer periphery of the annular element 3 so as to be able to deform the element and force the tongues 4 with smoothly varying pressure against the surface 21.

It has been found that making the ring 12, and hence the surface 21, of aluminum and the element 3 of a tough, resilient, low coefficient of friction material such as polytetrafluoroethylene, i.e., Teflon, gives a smooth acting, wide range of frictional resistance to relative rotation of the ring 12 and the element 3 which is also, of course, the same resistance that the operator feels when using the lever 13 to rotate the zoom cylinder 1 relative to the fixed lens element 7.

For selectively locking the ring 12 and member 5 in adjusted position, a clamp screw 6 is threaded into the member through an arcuate slot 25 in the ring. A shoulder 26 on the screw 6 bears on the outer surface of the ring 12 when the screw 6 is tightened so as to lock the parts against relative threadable displacement.

It can now be seen that there has been provided in the device 20 a means that permits smooth, jerk free zooming of the lens that is quite equivalent in user reaction to the smooth panning and tilting obtained by using a fluid type of camera pan head. The device 20 also can be easily adjusted to permit a wide range of uniform forces resisting zooming movement from a condition where the lens operates as if the device were not present to an adjusted condition where there is strong but uniform resistance to zooming movement such that considerable pressure on the lever 13 accomplishes a smooth continuous zooming action through a number of minutes.

It will also be readily apparent to those skilled in the art that the device 20 is compact, inexpensive to manufacture, easy to install on or build into a lens and, because of the relative simplicity of construction, reliable in operation.

Because of the differences of materials involved in the construction of the device 20, and the lenses with which it may be used, temperature variations will result in differential thermal expansion and contraction between the parts. Such changes are easily compensated for by threadably adjusting the ring 12 and the pressure member 5—the cameraman being able to readily feel when he has the desired resistance to zooming movement.

I claim as my invention:

1. For use with a zoom lens having a fixed element and a zoom cylinder rotatable relative to the fixed element for varying the effective focal length of the lens, a device comprising, in combination, a ring mounted for relative rotation on said zoom cylinder and defining an inner cylindrical surface, an annular element of deformable material having a low coefficient of friction fixed to said zoom cylinder and formed with a tongue in engagement with said cylinder surface, a pressure member threaded into said ring and having a surface bearing against said element, and means for floatingly locking said member to said fixed element to prevent relative rotation, whereby rotation of said ring, through said threaded pressure member, selectively deforms said element to vary the pressure of said tongue on said surface and thus establish a controllable resistance to relative rotation of the zoom cylinder and the fixed element.

2. The combination of claim 1 in which said element is formed of polytetrafluoroethylene in a cross sectional U-shape defining two tongues engaging said surface.

3. The combination of claim 1 in which said means can be adjusted to release said locking to allow the lens to operate as if said device were not present.

4. The combination of claim 1 in which said element is fixed to said zoom cylinder through a collar so that the collar and said means can be separated from the lens as a distinct attachment.

5. The combination of claim 1 including means for selectively locking said ring and said member together against relative threadable displacement.

* * * * *